United States Patent
Zeng et al.

(10) Patent No.: US 9,380,352 B2
(45) Date of Patent: Jun. 28, 2016

(54) METHOD AND SYSTEM FOR PLAYING SET-TOP BOX STARTUP ADVERTISEMENT, AND SET-TOP BOX

(71) Applicant: ZTE CORPORATION, Shenzhen, Guangdong Province (CN)

(72) Inventors: Zheng Zeng, Shenzhen (CN); Moushan Yu, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/418,356

(22) PCT Filed: Jul. 24, 2013

(86) PCT No.: PCT/CN2013/080042
§ 371 (c)(1),
(2) Date: Jan. 29, 2015

(87) PCT Pub. No.: WO2013/185685
PCT Pub. Date: Dec. 19, 2013

(65) Prior Publication Data
US 2015/0264449 A1    Sep. 17, 2015

(30) Foreign Application Priority Data
Jul. 31, 2012    (CN) .......................... 2012 1 0268389

(51) Int. Cl.
*H04N 5/445*    (2011.01)
*G06F 13/00*    (2006.01)
(Continued)

(52) U.S. Cl.
CPC ......... *H04N 21/812* (2013.01); *H04N 21/4432* (2013.01); *H04N 21/44222* (2013.01);
(Continued)

(58) Field of Classification Search
USPC .......................................... 725/32, 60, 93–95
See application file for complete search history.

(56) References Cited

U.S. PATENT DOCUMENTS

2003/0122864 A1    7/2003    Jenne et al.
2007/0121581 A1    5/2007    Tricaud
(Continued)

FOREIGN PATENT DOCUMENTS

CN    101018364 A    8/2007
CN    101079724 A    11/2007
(Continued)

OTHER PUBLICATIONS

European Search Report dated Jun. 5, 2015 of European patent Application No. 13803771.8.
(Continued)

*Primary Examiner* — Hunter B Lonsberry
(74) *Attorney, Agent, or Firm* — Plumsea Law Group, LLC (57) ABSTRACT

The present document discloses a method and a system for playing a set-top box power-on advertisement and a set-top box, the method includes: according to the power-on advertisement playing notification returned by the IPTV platform, the set-top box acquiring from the advertisement management module the URL address corresponding to a content of the power-on advertisement in which a subscriber is interested and analyzed according to a hotness value of the subscriber watching TV programs/videos on demand, wherein the hotness value is analyzed by the advertisement management module according to a watching record of the subscriber of the set-top box by means of cloud statistical analysis; the set-top box establishing a connection with an advertisement media server according to the URL address, and playing the power-on advertisement.

11 Claims, 7 Drawing Sheets

(51) Int. Cl.
    *G06F 3/00*            (2006.01)
    *H04N 21/81*          (2011.01)
    *H04N 21/442*        (2011.01)
    *H04N 21/443*        (2011.01)
    *H04N 21/61*          (2011.01)
    *H04N 21/658*        (2011.01)
    *H04N 21/858*        (2011.01)

(52) U.S. Cl.
    CPC ....... *H04N21/6125* (2013.01); *H04N 21/6175* (2013.01); *H04N 21/6581* (2013.01); *H04N 21/8586* (2013.01)

(56) References Cited

U.S. PATENT DOCUMENTS

| | | |
|---|---|---|
| 2008/0077784 A1 | 3/2008 | Robinson et al. |
| 2009/0094634 A1 | 4/2009 | Haberman et al. |
| 2010/0146531 A1 | 6/2010 | Fu et al. |
| 2014/0298389 A1* | 10/2014 | Sansom .............. G06F 17/3082 725/60 |

FOREIGN PATENT DOCUMENTS

| | | |
|---|---|---|
| CN | 101197925 A | 6/2008 |
| CN | 101426101 A | 5/2009 |
| CN | 100536467 C | 9/2009 |
| CN | 101950287 A | 1/2011 |
| CN | 101686385 B | 12/2011 |
| CN | 102364956 A | 2/2012 |
| JP | 2007178625 A | 7/2007 |

OTHER PUBLICATIONS

Singaporean Office Action issued Oct. 15, 2015 in Singaporean Patent Application No. 11201500702Q.

* cited by examiner

METHOD AND SYSTEM FOR PLAYING SET-TOP BOX STARTUP ADVERTISEMENT, AND SET-TOP BOX

CROSS-REFERENCE TO RELATED APPLICATION(S)

This application is the U.S. National Phase application of PCT application number PCT/CN2013/080042 having a PCT filing date of Jul. 24, 2013, which claims priority of Chinese patent application 201210268389.9 filed on Jul. 31, 2012, the disclosures of which are hereby incorporated by reference.

TECHNICAL FIELD

The present document relates to the internet TV field, and particularly, to a method and a system for playing set-top box power-on advertisement and a set-top box.

BACKGROUND OF THE RELATED ART

IPTV (Internet Protocol Television) is a brand-new technology integrating a plurality of techniques such as internet, multimedia, communication and so on together by broadband cable TV network to provide family subscribers with a plurality of interactive services including digital TV. As a new media form, IPTV changes the original concept of "watching TV". "Watching TV" does no longer mean watching TV passively as its original meaning, but the subscribers can interactively choose and control the programs, enjoying new experiences and obtaining personalized program content service; moreover, in the meantime of watching IPTV videos on demand, the subscriber can choose operations such as fast forward, back, time-shift as so on. IPTV streaming media set-top box is a broadband family multi-media terminal, using TV as the mainly display device, remoter as the mainly input device, receiving and controlling multi-media programs such as audios, videos, data and pictures etc. via IP network. Multimedia audio and video services such as live radio and TV programs, videos on demand, remote education and so on, and Internet services such as web browsing, instant message, online game, e-mail, video telephone and so on can be provided.

As an important service of media as well as an important source of operation income, advertisements are played during TV programs in convention, which is one of the main forms. With a sudden rise of IPTV videos on demand and internet videos on demand, ways of advertising are diversified, for example, advertisements at the beginning of the programs, advertisements at the end of the programs, advertisements during the pause of the programs, EPG (Electronic Program Guide) injecting advertisements, and set-top box power-on advertisements etc. At present, the contents of the set-top box power-on advertisements are rather fixed, i.e. the advertisement content is downloaded at first according to the configuration of the set-top box, and then the advertisements downloaded are played when the set-top box is powered on. Such advertisements are short of personalized and real-time characteristics; and a great of service determining logics are performed at local, which will heavy the burden of the set-top box, affect the loading speed of other application programs.

SUMMARY

The main purpose of the embodiments of the present document is to provide a method and a system for playing a set-top box power-on advertisement and a set-top box, so that when the set-top box is powered on, it can play personalized advertisements to the subscriber in real time, and bring good experiences to the subscriber without impacting the loading speed of other application programs.

The embodiment of the present document provides a method for playing a set-top box power-on advertisement, comprising after receiving a power-on message reported by a set-top box, an IPTV platform determining whether to play a power-on advertisement, and if yes, returning a power-on advertisement playing notification to the set-top box;

the set-top box sending an advertisement acquiring request to an advertisement management module according to the power-on advertisement playing notification, and acquiring a uniform resource locator (URL) address of the corresponding power-on advertisement;

the set-top box establishing a connection with an advertisement media server according to the URL address, and playing the power-on advertisement transmitted by the advertisement media server.

Preferably, the URL address is a URL address which is corresponding to a content of the power-on advertisement in which a subscriber is interested and is analyzed according to a hotness value of the subscriber watching TV programs/videos on demand, wherein the hotness value is analyzed by the advertisement management module according to watching record of the subscriber of the set-top box by means of cloud statistical analysis.

Preferably, the IPTV platform determining whether to play a power-on advertisement comprises:

the IPTV platform acquiring subscriber information of the set-top box, and determining a subscriber type of the set-top box; wherein the subscriber type includes common subscriber and VIP subscriber; and determining whether to play the power-on advertisement according to the subscriber type.

Preferably, the set-top box establishing a connection with an advertisement media server according to the URL address, and playing the power-on advertisement transmitted by the advertisement media server comprises:

the set-top box establishing the connection with the advertisement media server through a streaming media server according to the URL address, and creating a service thread;

receiving the power-on advertisement transmitted by the advertisement media server, and playing the power-on advertisement while starting up an application program.

Preferably, before the set-top box sending an advertisement acquiring request to an advertisement management module, the method further comprises:

the advertisement management module collecting and analyzing an operation record of the subscriber, and obtaining a power-on advertisement type corresponding to the operation record;

matching for the set-top box with the corresponding power-on advertisement according to the power-on advertisement type.

Preferably, before the IPTV platform determining whether to play a power-on advertisement, the method further comprises:

after the set-top box is powered on, starting up an operation system and a streaming media player, and reporting the power-on message to the IPTV platform.

The embodiment of the present document also provides a set-top box, comprising:

a reporting module, configured to report a power-on message to an IPTV platform;

a URL address acquiring module, configured to send an advertisement acquiring request to an advertisement management module according to a power-on advertisement playing notification, and acquire a uniform resource locator (URL) address of the corresponding power-on advertisement;

an advertisement playing module, configured to establish a connection with an advertisement media server according to the URL address, and play the power-on advertisement transmitted by the advertisement media server.

Preferably, the advertisement playing module being configured to establish a connection with an advertisement media server according to the URL address, and play the power-on advertisement transmitted by the advertisement media server, comprises:

establishing the connection with the advertisement media server through a streaming media server according to the URL address, and creating a service thread;

receiving the power-on advertisement transmitted by the advertisement media server, and playing the power-on advertisement while starting up an application program.

Preferably, the set-top box further comprises:

a starting module, configured to start up an operation system and a streaming media player after the set-top box is powered on.

The embodiment of the present document also provides a system for playing a set-top box power-on advertisement, comprising: an internet protocol television (IPTV) platform, and the set-top box and the advertisement management module as described above, wherein, the IPTV platform is configured to determine whether to play a power-on advertisement after receiving a power-on message reported by the set-top box, if yes, return a power-on advertisement playing notification to the set-top box;

the advertisement management module is configured to analyze a hotness value of a subscriber watching TV programs/videos on demand according to a watching record of the subscriber of the set-top box by means of cloud statistical analysis, and analyze according to the hotness value a uniform resource locator (URL) address corresponding to a content of the power-on advertisement in which the subscriber is interested;

the set-top box is configured to send an advertisement acquiring request to the advertisement management module according to the power-on advertisement playing notification, and acquire the URL address of the corresponding power-on advertisement; establish a connection with an advertisement media server according to the URL address, and play the power-on advertisement transmitted by the advertisement media server.

Preferably, the IPTV platform comprises:

an acquiring module, configured to acquire subscriber information of the set-top box;

a first determination module, configured to determine a subscriber type of the set-top box; wherein the subscriber type includes common subscriber and VIP subscriber;

a second determination module, configured to determine whether to play the power-on advertisement according to the subscriber type.

Preferably, the system for playing a set-top box power-on advertisement further comprises an advertisement management module, and the advertisement management module is configured to:

collect and analyze an operation record of a subscriber, and obtain a power-on advertisement type corresponding to the operation record;

match for the set-top box with the corresponding power-on advertisement according to the power-on advertisement type.

Preferably, the advertisement media server is further configured to:

create a service thread with a steaming media server; and transmit the power-on advertisement to the set-top box.

In the embodiment of the present document, the set-top box reports a power-on message to the IPTV platform, and the IPTV platform returns back a power-on advertisement playing notification to the set-top box after determining that the subscriber of the set-top box needs to play the power-on advertisement; the set-top box sends a request for acquiring the URL address of the power-on advertisement matched with the set-top box to the advertisement management module according to the power-on advertisement playing notification, establishes a connection with the advertisement media server according to the URL address, and plays the power-on advertisement transmitted by the advertisement media server. By applying this method, the personalized advertisements corresponding to the set-top box are played to the subscriber in real time during the waiting time while starting the application programs after the set-top box is powered on. By this way, it can implement the function of pushing the advertisement without affecting the loading speed of other application programs, and can also bring good experiences to the subscriber.

The implementation of the aim, function features and virtues of the embodiments of the present document will be further demonstrated in combination with embodiments by reference to the figures.

PREFERRED EMBODIMENTS OF THE INVENTION

It should be understood that the specific embodiments described here are merely used to explain the present document, while are not used to limit the present document.

Figure 1:
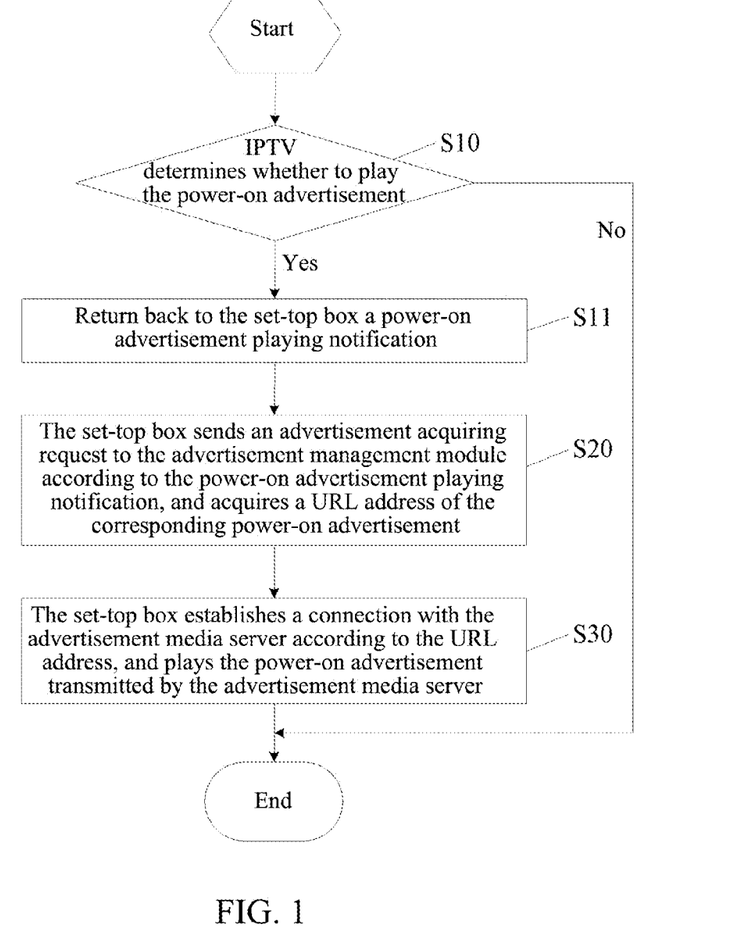
FIG. 1 is a flowchart of one embodiment of the method for playing a set-top box power-on advertisement according to the embodiments of the present document.

Referring to FIG. 1, FIG. 1 is the flowchart of the method for playing a set-top box power-on advertisement according to the present document.

The method for playing a set-top box power-on advertisement comprises:

In step S10, after receiving a power-on message reported by a set-top box, an IPTV platform determines whether to play a power-on advertisement, if yes, it is to proceed to step S11;

In step S11, a power-on advertisement playing notification is returned to the set-top box;

in the method for playing a set-top box power-on advertisement provided by the embodiment of the present document, after being started up, the set-top box reports a power-on message to the IPTV platform; while after receiving the power-on message reported by the set-top box, the IPTV platform determines whether the set-top box is to play the power-on advertisement, and, when determining that the set-top box needs to play the power-on advertisement, returns a power-on advertisement playing notification to the set-top box to notify the set-top box to play the power-on advertisement.

In the present embodiment, before determining whether the set-top box is to play the power-on advertisement, the IPTV platform also needs to acquire the ID information of the set-top box, and performs authentication on the identification of the set-top box according to the ID information. In another word, the set-top box cannot log on the subscriber management system of the IPTV platform until it passes authentication. In the present embodiment, the authentication process is that the set-top box inputs a subscriber's password or IPTVSIM card key, and, after determining that it has passed the safety certification, acquires the subscriber's token as a certification evidence of the interaction process. After the certification is passed, the IPTV platform permits the set-top box to access to the subscriber management system thereof to acquire the subscriber information of the subscriber of the present set-top box.

In step S20, the set-top box sends an advertisement acquiring request to an advertisement management module according to the power-on advertisement playing notification, and acquires a URL address of the corresponding power-on advertisement;

after receiving the power-on advertisement playing notification returned by the IPTV platform, the set-top box sends to the advertisement management module the advertisement acquiring request for acquiring the power-on advertisement corresponding to the set-top box. In the present embodiment, the advertisement management module matches for each set-top box subscriber with a corresponding power-on advertisement, and, after receiving the advertisement acquiring request sent by the set-top box, feeds back the URL address of the corresponding power-on advertisement to the set-top box, in this way, the set-top box acquires the URL address of the corresponding power-on advertisement. In the present embodiment, the URL address is a URL address which is corresponding to the power-on advertisement content in which the subscriber is interested and is analyzed according to the hotness value of the subscriber watching the TV programs/videos on demand, wherein the hotness value is analyzed by the advertisement management module according to the watching record of the set-top box subscriber by means of cloud statistical analysis.

In step S30, according to the URL address, the set-top box establishes a connection with an advertisement media server, and plays the power-on advertisement transmitted by the advertisement media server.

After acquiring the URL address of the power-on advertisement, the set-top box establishes the connection with corresponding advertisement media server according to the URL address. In the present embodiment, the advertisement media server is used to provide the content of the power-on advertisement corresponding to the URL address, and, after the set-top box establishes the connection with it, the advertisement media server sends the content of the power-on advertisement to the set-top box. After receiving the power-on advertisement transmitted by the advertisement media server, the set-top box plays the power-on advertisement. In such a way, the function of playing corresponding set-top box power-on advertisement to the subscriber targetedly in real-time is implemented.

In the embodiment of the present document, the set-top box reports a power-on message to the IPTV platform, and the IPTV platform returns back a power-on advertisement playing notification to the set-top box after determining that the subscriber of the set-top box needs to play the power-on advertisement; the set-top box sends a request for acquiring the URL address of the power-on advertisement matched with the set-top box to the advertisement management module according to the power-on advertisement playing notification, establishes a connection with the advertisement media server according to the URL address, and plays the power-on advertisement transmitted by the advertisement media server. By applying this method, the personalized advertisements corresponding to the set-top box are played to the subscriber in real time during the waiting time while starting the application programs after the set-top box is powered on. By this way, the function of pushing the advertisement can be implemented without impacting the loading speed of other application programs, and good experiences can also be brought to the subscriber.

Figure 2:
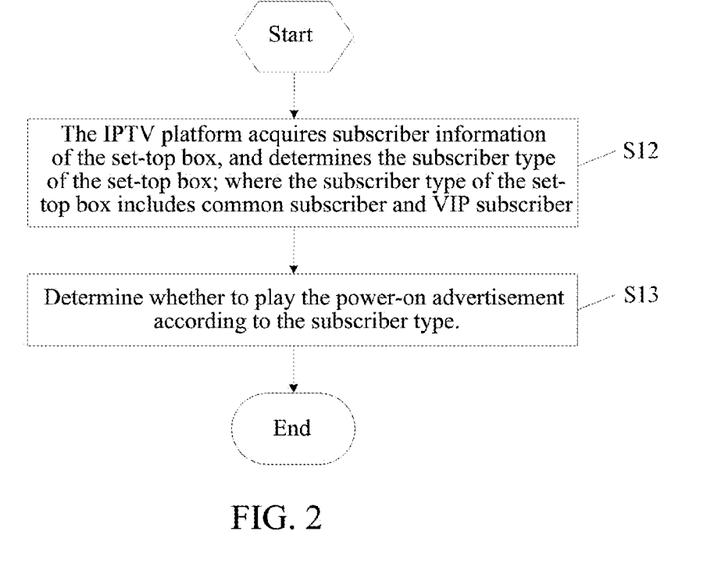
FIG. 2 is a flowchart of one embodiment of the IPTV platform determining whether to play a power-on advertisement in the method for playing a set-top box power-on advertisement according to the embodiments of the present document.

Referring to FIG. 2, FIG. 2 is the flowchart of the IPTV platform determining whether to play a power-on advertisement in the method for playing a set-top box power-on advertisement according to the embodiments of the present document.

In the present embodiment, step S10 comprises:

In step S12, the IPTV platform acquires subscriber information of the set-top box, and determines a subscriber type of the set-top box; wherein, the subscriber type of the set-top box includes common subscriber and VIP subscriber;

In step S13, according to the subscriber type, it determines whether to play the power-on advertisement.

After receiving the power-on message reported by the set-top box, the IPTV performs authentication on the identification of the set-top box; and after the set-top box passes the certification and logs on the subscriber management system of the IPTV platform, IPTV platform acquires the subscriber information of the set-top box and determines the subscriber type of the set-top box according to the subscriber information. In the present embodiment, the subscriber type of the set-top box may include common subscriber and VIP subscriber. Since the limits of authority and the configurations for the common subscriber and the VIP subscriber are different, whether to play the power-on advertisement and when to play the power-on advertisement are different for the common subscriber and the VIP subscriber. For instance, it may configure the set-top box of the common subscriber to play the power-on advertisement when powering on, while for the VIP subscriber, it may configure the set-top box to play the power-on advertisement only at specific time periods such as in the evening and so on.

After the subscriber type of the set-top box is determined, whether it is necessary to play the power-on advertisement is further determined according to the subscriber type. In the present embodiment, based on the different configuration, when the subscriber type is common subscriber, it is determined that the set-top box needs to play the power-on advertisement; while when the subscriber type is VIP subscriber, it is also needed to determine whether the current time period is within a time period set for playing the power-on advertisement according to the configuration of the set-top box, if yes, then it is determined that the set-top box needs to play the power-on advertisement.

After the set-top box has passed the certification and logged on the subscriber management system of the IPTV platform, the IPTV platform acquires the subscriber information of the set-top box, and determines whether the subscriber type of the set-top box is common subscriber or VIP subscriber; and further determines whether the set-top box needs to play the power-on advertisement according to the subscriber type and the configuration corresponding to the subscriber type. By determining the subscriber type of the set-top box and according to the different configurations of the different subscriber types, whether the set-top box is to play the power-on advertisement is determined. With such a different treatment, it can implement the accurate release of their interesting advertisement to the subscribers; thereby, it can further insure the good experiences to subscribers.

Figure 3:
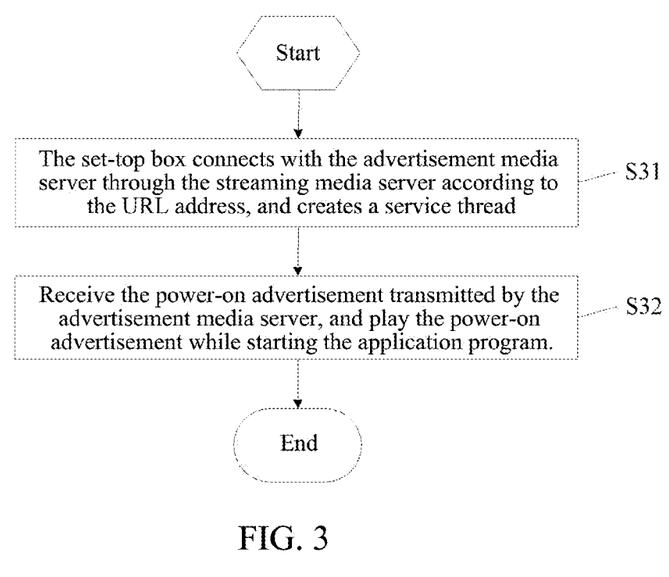
FIG. 3 is a flowchart of one embodiment of a set-top box playing a power-on advertisement in the method for playing a set-top box power-on advertisement according to the embodiments of the present document.

Referring to FIG. 3, FIG. 3 is the flowchart of a set-top box playing a power-on advertisement in the method for playing a set-top box power-on advertisement according to the embodiments of the present document.

In the present embodiment, the step S30 comprises:

In step S31, the set-top box connects with the advertisement media server through the streaming media server according to the URL address, and creates a service thread;

In step S32, the power-on advertisement transmitted by the advertisement media server is received, and the power-on advertisement is played while starting application programs.

After acquiring the URL address corresponding to the power-on advertisement fed back by the advertisement management module, the set-top box establishes a connection with the corresponding advertisement media server according to the URL address. In the present embodiment, the set-top box establishes the connection with the advertisement media server through a streaming media server. After the connection with the advertisement media server is established, a corresponding service thread is created, and after being collected, buffered, and scheduled, the corresponding power-on advertisement is sent to the set-top box by the advertisement media server. After receiving the power-on advertisement, the set-top box plays the content of the power-on advertisement while starting the application programs thereof.

Since different application programs spend different time to start up, it is required to determine whether the startup of the application program has been completed after the playing of the power-on advertisement is finished in this embodiment. If completed, it is to enter the application program; if not completed, the set-top box may continue to send the power-on advertisement acquiring request to the advertisement management module, and, after receiving the URL address of the power-on advertisement, it is to continue to establish the connection with the advertisement media server and play the power-on advertisement transmitted by the advertisement media server. By this way, the waiting time during the startup of the application programs can be fully taken to play for the subscriber the advertisements in which the subscriber is interested.

After acquiring the URL address of the power-on advertisement, the set-top box connects with the advertisement media server through the streaming media server according to the URL address and creates the service thread; and, after receiving the power-on advertisement transmitted by the advertisement media server, plays the power-on advertisement while starting up the application programs. By this way, it further ensures that personalized advertisements corresponding to the set-top box can be played for the subscriber in real time; thereby it can further bring good experiences to subscribers.

Figure 4:
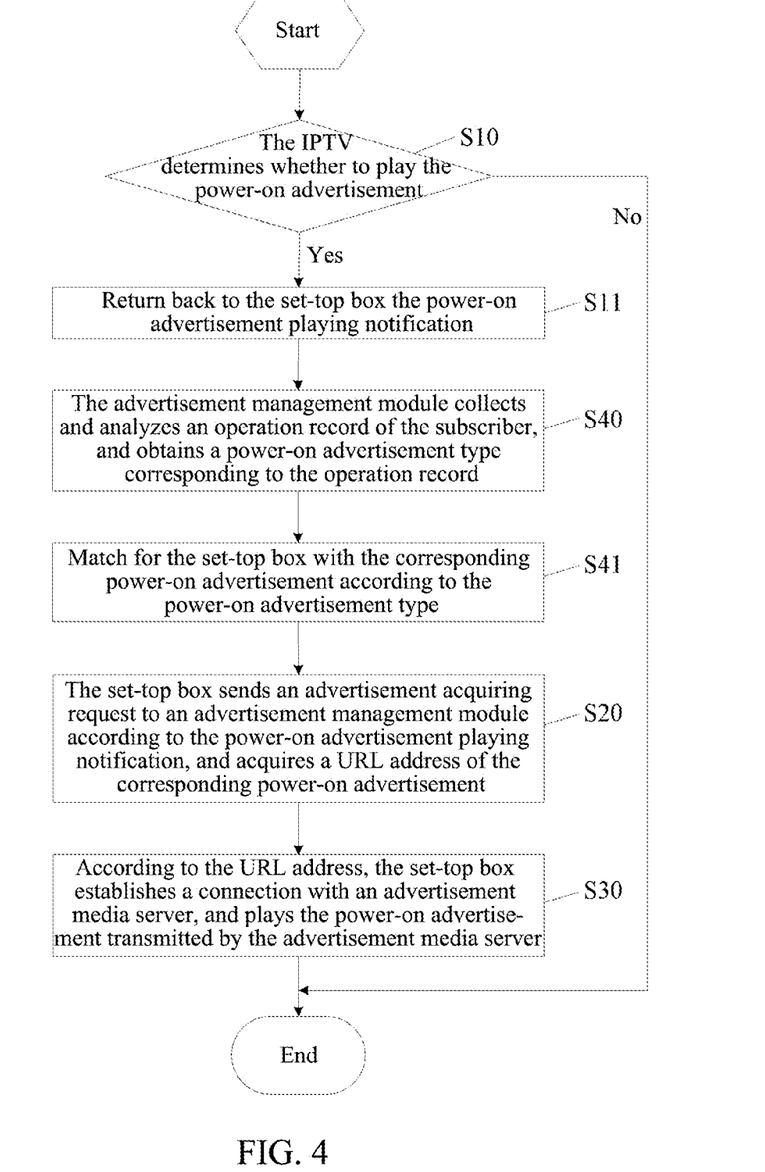
FIG. 4 is a flowchart of another embodiment of the method for playing a set-top box power-on advertisement according to the embodiments of the present document.

Referring to FIG. 4, FIG. 4 is the flowchart of another embodiment of the method for playing a set-top box power-on advertisement according to the present document.

Based on the method for playing a set-top box power-on advertisement according to one embodiment of the present document, before executing step S20, the method further comprises:

In step S40, the advertisement management module collects and analyzes an operation record of the subscriber, and obtains a power-on advertisement type corresponding to the operation record;

In step S41, it is to match for the set-top box with the corresponding power-on advertisement according to the power-on advertisement type.

In the present embodiment, the advertisement management module matches for different set-top box subscribers with its corresponding different power-on advertisements. Therefore, the advertisement management module is required to collect the operation records of the subscribers, records the types of the TV programs watched by the subscribers through the electronic program menus of the set-top boxes, the types of the video programs on demand through an interactive video on demand system, and the operation habits for performing operation by the subscribers and so on. For example, the subscriber likes watching programs in sports channels or programs of football type, the subscriber usually watches this type of programs at ten to twelve o'clock in the evening, and usually switches among several sports channels during the watching.

Analysis on the above data reveals that the subscriber is an audience, who is used to watching sports programs of different channels during ten to twelve o'clock in the evening. Thus, it can define the attribute tag for the set-top box subscriber as watching sports programs during ten to twelve o'clock in the evening. The advertisement management module binds the attribute tag of the set-top box subscriber with the set-top box, and configures corresponding power-on advertisement type for the subscriber according to the attribute tag. Afterwards, the advertisement management module 300 matches for the set-top box with the power-on advertisement corresponding to the power-on advertisement type thereof.

The advertisement management module is used to collect and analyze the operation record of the subscriber, which is the record of the type of the TV programs and the type of the video programs on demand liked by the subscriber and the operation habit, define corresponding attribute tag for the set-top subscriber, and set corresponding power-on advertisement type for the subscriber according to the attribute tag; afterwards, match for the set-top box with its corresponding power-on advertisement according to the type of the power-on advertisement. By this way, the set-top boxes are matched with different power-on advertisements according to different interests of the subscriber, thereby releasing personalized advertisements to different subscribers.

Figure 5:
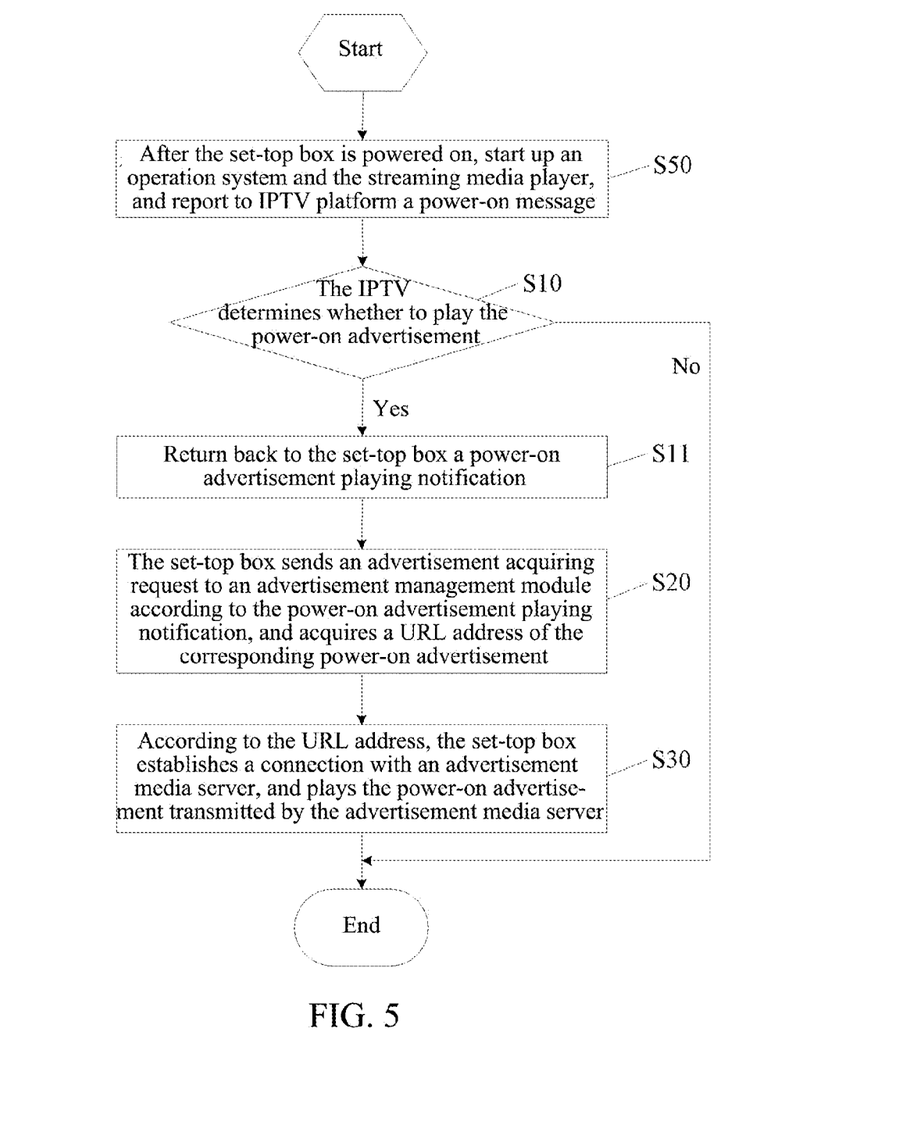
FIG. 5 is a flowchart of a further embodiment of the method for playing a set-top box power-on advertisement according to the embodiments of the present document.

Referring to FIG. 5, FIG. 5 is the flowchart of a further embodiment of the method for playing a set-top box power-on advertisement according to the present document.

Based on the method for playing a set-top box power-on advertisement according to the embodiment of the present document, before executing step S10, the method further comprises:

In step S50, after the set-top box is powered on, an operation system and a streaming media player are started up, and a power-on message is reported to an IPTV platform.

In the present embodiment, after the set-top box is powered on and started up, the operation system is started up at first, wherein the operation system of the set-top box may adopt a system such as Android system, Windows CE operation system, or Linux operation system and so on; after the operation system has been started up and before other application programs of the set-top box are started up, the streaming media player of the set-top box is started up with priority, so that the power-on advertisement can be played by the streaming media player after the power-on advertisement transmitted by the advertisement media server is received; and, the power-on message is reported to the IPTV platform.

After the set-top box is powered on and started up, the operation system is started up at first, then the streaming media player is started up with priority to other application programs, and the power-on message is reported to the IPTV platform. By this way, it can fully take advantage of the waiting time during the startup of application programs; after the set-top box asks for and obtains the URL address of the power-on advertisement, the set-top box connects with the advertisement media server through the streaming media player, and plays the power-on advertisement to the subscriber thereof after receiving the power-on advertisement.

Figure 6:
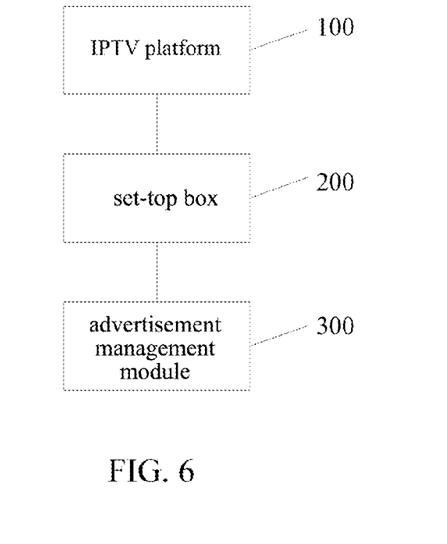
FIG. 6 is a schematic diagram of the structure of one embodiment of the system for playing a set-top box power-on advertisement according to the embodiments of the present document.

Referring to FIG. 6, FIG. 6 is a schematic diagram of the structure of the system for playing a set-top box power-on advertisement according to the embodiment of the present document.

The system for playing a set-top box power-on advertisement comprises: an IPTV platform 100, a set-top box 200, and an advertisement management module 300, wherein, the IPTV platform 100 is configured to determine whether to play a power-on advertisement after receiving a power-on message reported by the set-top box, and, if yes, return back a power-on advertisement playing notification to the set-top box;

the set-top box 200 is configured to send an advertisement acquiring request to the advertisement management module according to the power-on advertisement playing notification, and acquire a URL address corresponding to the power-on advertisement; establish a connection with an advertisement media server according to the URL address, and play the power-on advertisement transmitted by the advertisement media server;

the advertisement management module 300 is configured to analyze a hotness value of the subscriber watching TV programs/videos on demand according to the watching record of the set-top box subscriber by means of cloud statistical analysis, and analyze the URL address corresponding to content of the power-on advertisement in which the subscriber is interested according to the hotness value.

The system for playing a set-top box power-on advertisement provided by the embodiment of the present document comprises: an IPTV platform 100 and a set-top box 200. After being powered on and started up, the set-top box 200 reports to the IPTV platform 100 a power-on message; after receiving the power-on message reported by the set-top box 200, the IPTV platform 100 determines whether the set-top box 200 is to play the power-on advertisement, and, after determining that the set-top box 200 needs to play the power-on advertisement, returns back a power-on advertisement playing notification to the set-top box 200, and notifies the set-top box 200 to play the power-on advertisement.

In the present embodiment, before determining whether the set-top box 200 is to play the power-on advertisement, the IPTV platform 100 is also required to acquire ID information of the set-top box 200, and perform authentication on the identification of the set-top box 200 according to the ID information, that is, the set-top box 200 cannot log on the subscriber management system of the IPTV platform 1010 until the set-top box 200 has passed certification. In the present embodiment, the process of authentication is: the set-top box 200 inputs the subscriber password or IPTVSIM card key, and acquires a subscriber token as a certification evidence of the interaction process after ensuring that the set-top box 200 has passed the safety certification. After the set-top box 200 has passed the certification, the IPTV platform 100 permits the set-top box 200 to access to other subscriber management system to acquire the subscriber information of the subscriber of the present set-top box.

After receiving the power-on advertisement playing notification returned by the IPTV platform 100, the set-top box 200 sends an advertisement acquiring request for the power-on advertisement corresponding to the set-top box 200. In the present embodiment, the advertisement management module 300 matches for each set-top subscriber with a corresponding power-on advertisement thereof, analyzes the hotness value of the subscriber watching TV programs/videos on demand according to the watching record of the set-top box subscriber by means of cloud statistical analysis, and analyzes the URL address corresponding to the power-on advertisement content in which the subscriber is interested according to the hotness value. After receiving the advertisement acquiring request sent by the set-top box 200, the advertisement management module 300 feeds back the URL address of the corresponding power-on advertisement to the set-top box 200; thereby, the set-top box 200 acquires the URL address of the corresponding power-on advertisement thereof.

After acquiring the URL address of the power-on advertisement, the set-top box 200 establishes a connection with the corresponding advertisement media server according to the URL address. In the present document, the advertisement media server is configured to provide the content of the power-on advertisement corresponding to the URL address, and transmits the content of the power-on advertisement to the set-top box 200 after the connection with the set-top box 200 has been established. After receiving the power-on advertisement transmitted by the advertisement media server, the set-top box 200 plays the power-on advertisement. By this way, the function of playing the corresponding set-top box power-on advertisement to the subscriber with target in real time is implemented.

In the embodiment of the present document, the set-top box reports a power-on message to the IPTV platform, and the IPTV platform returns back a power-on advertisement playing notification to the set-top box after determining that the subscriber of the set-top box needs to play the power-on advertisement; the set-top box sends a request for acquiring the URL address of the power-on advertisement matched with the set-top box to the advertisement management module according to the power-on advertisement playing notification, establishes the connection with the advertisement media server according to the URL address, and plays the power-on advertisement transmitted by the advertisement media server. By applying this method, the personalized advertisements corresponding to the set-top box are played to the subscriber in real time during the waiting time while starting the application programs after the set-top box is powered on. By this way, it can implement the function of pushing the advertisement without affecting the loading speed of other application programs, and can also bring good experiences to the subscriber.

Figure 7:
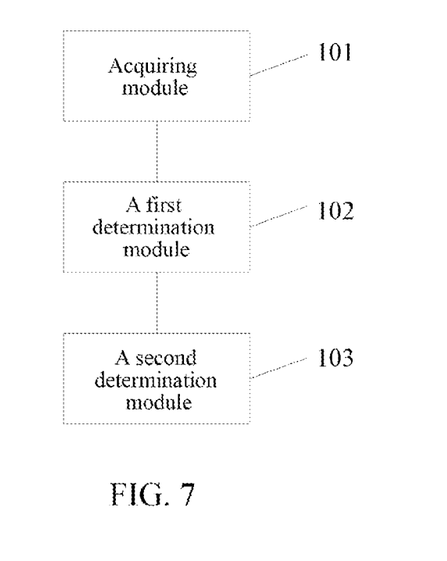
FIG. 7 is a schematic diagram of the structure of one embodiment of the IPTV platform in the system for playing a set-top box power-on advertisement according to the embodiments of the present document.

Referring to FIG. 7, FIG. 7 is the schematic diagram of the structure of the IPTV platform in the system for playing a set-top box power-on advertisement according to one embodiment of the present document.

In the present embodiment, the IPTV platform 100 comprises:

an acquiring module 101, configured to acquire subscriber information of the set-top box;

a first determination module 102, configured to determine a subscriber type of the set-top box; wherein the subscriber type includes common subscriber and VIP subscriber; and a second determination module 103, configured to determine whether to play a power-on advertisement according to the subscriber type.

After receiving the power-on message reported by the set-top box 200, the IPTV platform 100 performs authentication on the identification of the set-top box 200; after the set-top box 200 has passed certification and logs on a subscriber management system of the IPTV platform 100, the IPTV platform 100 acquires subscriber information of the set-top box 200 through the acquiring module 101, and determines the subscriber type of the set-top box 200 according to the subscriber information through the first determination module 102. In the present embodiment, the subscriber type of the set-top box may include common subscriber and VIP subscriber, while for the common subscriber and the VIP subscriber, whether to play the power-on advertisement and when to play the power-on advertisement are different since the limits of the privilege and the configurations for the common subscriber and the VIP subscriber are different. For instance, the set-top box of common subscriber may be configured to play the power-on advertisement when power is on, while the set-top box of the VIP subscriber may be configured to play the power-on advertisement only at certain time periods such as the evening and so on.

After the subscriber type of the set-top box 200 is determined, it is further to determine whether to play the power-on advertisement according to the subscriber type through the second determination module 103. In the present embodiment, based on different configurations, that is, when the subscriber type is common subscriber, it is determined that the set-top box 200 needs to play the power-on advertisement; while when the subscriber type is VIP subscriber, it is also needed to determine whether the current time period belongs to the time period configured for playing the power-on advertisements according to the configuration of the set-top box 200, if yes, it is determined that the set-top box 200 needs to play the power-on advertisement.

After the set-top box has passed the certification and logged on the subscriber management system of the IPTV platform, the IPTV platform acquires the subscriber information of the set-top box, and determines whether the subscriber type of the set-top box is common subscriber or VIP subscriber; and further determines whether the set-top box needs to play the power-on advertisement according to the subscriber type and the configuration corresponding to the subscriber type. By determining the subscriber type of the set-top box and according to the different configurations of the different subscriber types, whether the set-top box is to play the power-on advertisement is determined. With such a different treatment, it can implement the accurate release of their interested advertisement to the subscribers; thereby, it can further insure the good experiences to subscribers.

Based on the system for playing the set-top box power-on advertisement according to the embodiment of the present document, the advertisement management module 300 is further configured to:

collect and analyze an operation record of the subscriber, and obtain a power-on advertisement type corresponding to the operation record;

match for it with the corresponding power-on advertisement according to the power-on advertisement type.

In the present embodiment, the advertisement management module 300 matches for different set-top box subscribers with its corresponding different power-on advertisements. Therefore, the advertisement management module 300 is required to collect the operation records of the subscribers, records the types of the TV programs watched by the subscribers through the electronic program menus of the set-top boxes 200, the types of the video programs on demand through an interactive video on demand system, and the operation habits for performing operation by the subscribers and so on. For example, the subscriber likes watching programs in sports channels or programs of football type, the subscriber usually watches this type of programs at ten to twelve o'clock in the evening, and usually switches among several sports channels during the watching.

Analysis on the above data reveals that the subscriber is an audience, who is used to watching sports programs of different channels during ten to twelve o'clock in the evening. Thus, it can define the attribute tag for the set-top box subscriber as watching sports programs during ten to twelve o'clock in the evening. The advertisement management module 300 binds the attribute tag of the set-top box subscriber with the set-top box 200, and configures corresponding power-on advertisement type for the subscriber according to the attribute tag. Afterwards, the advertisement management module 300 matches for the set-top box 200 with the power-on advertisement corresponding to the power-on advertisement type thereof.

The advertisement management module is used to collect and analyze the operation record of the subscriber, which is the record of the type of the TV programs and the type of the video programs on demand liked by the subscriber and the operation habit, define corresponding attribute tag for the set-top subscriber, and set corresponding power-on advertisement type for the subscriber according to the attribute tag; afterwards, match for the set-top box with its corresponding power-on advertisement according to the type of the power-on advertisement. By this way, the set-top boxes are matched with different power-on advertisements according to different interests of the subscriber, thereby releasing personalized advertisements to different subscribers.

Figure 8:
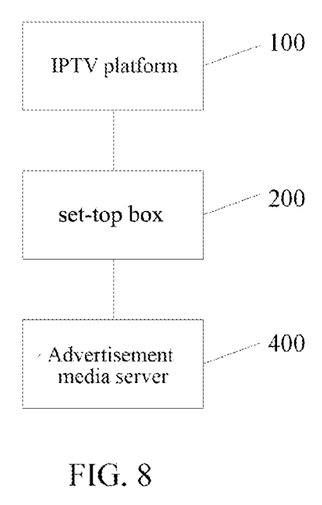
FIG. 8 is a schematic diagram of the structure of another embodiment of the system for playing a set-top box power-on advertisement according to the embodiments of the present document.

Referring to FIG. 8, FIG. 8 is the schematic diagram of the structure of a system for playing a set-top box power-on advertisement according to one embodiment of the present document.

Based on the system for playing a set-top box power-on advertisement according to one embodiment of the present document, the system further comprises: an advertisement media server 400, configured to:

create a service thread with a streaming media server, and transmit a power-on advertisement to the set-top box.

After acquiring the URL address corresponding to the power-on advertisement fed back by the advertisement management module 300, the set-top box 200 establishes a connection with the corresponding advertisement media server 400 according to the URL address. In the present embodiment, the advertisement media server 400 establishes a connection with the streaming media server of the set-top box 200. After the connection is established, a corresponding service thread is created, and after being collected, buffered, and scheduled, corresponding power-on advertisements are sent to the set-top box 200 by the advertisement media server 400. After receiving the power-on advertisement, the set-top box plays the content of the power-on advertisement while starting the application programs thereof.

Since different application programs spend different time to start up, it is required to determine whether the startup of the application program has been completed after the playing of the power-on advertisement is finished in this embodiment. If completed, it is to enter the application program; if not completed, the set-top box 200 may continue to send the power-on advertisement acquiring request to the advertisement management module 300, and, after receiving the URL address of the power-on advertisement, it is to continue to establish the connection with the advertisement media server 400 and play the power-on advertisement transmitted by the advertisement media server 400. By this way, the waiting time during the startup of the application programs can be fully taken to play for the subscriber the advertisements in which the subscriber is interested.

After acquiring the URL address of the power-on advertisement, the set-top box connects with the advertisement media server through the streaming media server according to the URL address and creates the service thread; and, after receiving the power-on advertisement transmitted by the advertisement media server, plays the power-on advertisement while starting up the application programs. By this way, it further ensures that personalized advertisements corresponding to the set-top box can be played for the subscriber in real time; thereby it can further bring good experiences to subscribers.

Figure 9:
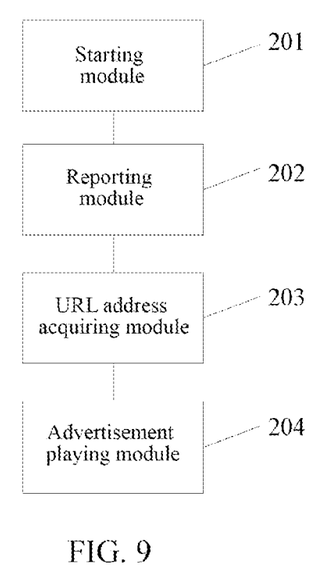
FIG. 9 is a schematic diagram of the structure of one embodiment of the set-top box in the system for playing a set-top box power-on advertisement according to the embodiments of the present document.

Referring to FIG. 9, FIG. 9 is the schematic diagram of the structure of the set-top box in the system for playing a set-top box power-on advertisement according to one embodiment of the present document.

In the present embodiment, the set-top box 200 comprises:

a starting module 201, configured to start up an operation system and a streaming media player after the set-top box is powered on;

reporting module 202, configured to report a power-on message to an IPTV platform;

a URL address acquiring module 203, configured to send an advertisement acquiring request to an advertisement management module according to the power-on advertisement playing notification, and acquire a Uniform Resource Locator (URL) address of the corresponding power-on advertisement;

an advertisement playing module 204, configured to establish a connection with an advertisement media server according to the URL address, and play the power-on advertisement transmitted by the advertisement media server.

In the present embodiment, after the set-top box 200 is powered on and started up, the operation system is started up at first by the starting module 201, wherein the operation system of the set-top box 200 may adopt a system such as Android system, Windows CE operation system, or Linux operation system and so on; after the operation system has been started up and before other application programs of the set-top box are started up, the streaming media player of the set-top box 200 is started up with priority by the starting module 201, so that the power-on advertisement can be played by the streaming media player after the power-on advertisement transmitted by the advertisement media server 400 is received; and, the power-on message is reported to the IPTV platform 100 by the reporting module 202.

After the set-top box is powered on and started up, the operation system is started up at first, then the streaming media player is started up with priority to other application programs, and the power-on message is reported to the IPTV platform. By this way, it can fully take advantage of the waiting time during the startup of application programs; after the set-top box asks for and obtains the URL address of the power-on advertisement, the set-top box connects with the advertisement media server through the streaming media player, and plays the power-on advertisement to the subscriber thereof after receiving the power-on advertisement.

The advertisement playing module being configured to establish a connection with the advertisement media server according to the URL address and play the power-on advertisement transmitted by the advertisement media server, comprises:

connecting with the advertisement media server through the streaming media server according to the URL address, and creating a service thread;

receiving the power-on advertisement transmitted by the advertisement media server, and playing the power-on advertisement during the startup of application programs.

The above description is just for the preferred embodiments of the present document, and is not used to limit the patent scope of the present document. All the equivalent structure or flowchart transformations made according to the specification and drawings of the present document, or the direct or indirect applications in other related technical fields shall all fall into the patent protection scope of the present document in the same way.

INDUSTRIAL APPLICABILITY

In the embodiment of the present document, the set-top box reports a power-on message to the IPTV platform, and the IPTV platform returns back a power-on advertisement playing notification to the set-top box after determining that the subscriber of the set-top box needs to play the power-on advertisement; the set-top box sends a request for acquiring the URL address of the power-on advertisement matched with the set-top box to the advertisement management module according to the power-on advertisement playing notification, establishes a connection with the advertisement media server according to the URL address, and plays the power-on advertisement transmitted by the advertisement media server. By applying this method, the personalized advertisements corresponding to the set-top box are played to the subscriber in real time during the waiting time while starting the application programs after the set-top box is powered on. By this way, it can implement the function of pushing the advertisement without affecting the loading speed of other application programs, and can also bring good experiences to the subscriber.

What we claim is:

1. A method for playing a set-top box power-on advertisement, comprising:

after receiving a power-on message reported by a set-top box, an internet protocol television (IPTV) platform determining whether to play a power-on advertisement, and if yes, returning a power-on advertisement playing notification to the set-top box;

the set-top box sending an advertisement acquiring request to an advertisement management module according to the power-on advertisement playing notification, and acquiring a uniform resource locator (URL) address of the corresponding power-on advertisement;

the set-top box establishing a connection with an advertisement media server according to the URL address, and playing the power-on advertisement transmitted by the advertisement media server;

wherein the IPTV platform determining weather to play a power-on advertisement comprises:

the IPTV platform acquiring subscriber information of the set-top box, and determining a subscriber type of the set-box; wherein a subscriber type includes common subscriber and VIP subscriber; and determining whether to play the power-on advertisement according to the subscriber type.

2. The method according to claim 1, wherein the URL address is a URL address which is corresponding to a content of the power-on advertisement in which a subscriber is interested and is analyzed according to a hotness value of the subscriber watching TV programs/videos on demand, wherein the hotness value is analyzed by the advertisement management module according to a watching record of the subscriber of the set-top box by means of cloud statistical analysis.

3. The method according to claim 2, wherein the set-top box establishing a connection with an advertisement media server according to the URL address, and playing the power-on advertisement transmitted by the advertisement media server comprises:

the set-top box establishing the connection with the advertisement media server through a streaming media server according to the URL address, and creating a service thread;

receiving the power-on advertisement transmitted by the advertisement media server, and playing the power-on advertisement while starting up an application program.

4. The method according to claim 3, before the set-top box sends an advertisement acquiring request to an advertisement management module, further comprising:

the advertisement management module collecting and analyzing an operation record of the subscriber, and obtaining a power-on advertisement type corresponding to the operation record;

matching for the set-top box with the corresponding power-on advertisement according to the power-on advertisement type.

5. The method according to claim 1, before the IPTV platform determines whether to play a power-on advertisement, further comprising:

after the set-top box is powered on, starting up an operation system and a streaming media player, and reporting the power-on message to the IPTV platform.

6. The method according to claim 2, before the IPTV platform determines whether to play a power-on advertisement, further comprising:

after the set-top box is powered on, starting up an operation system and a streaming media player, and reporting the power-on message to the IPTV platform.

7. The method according to claim 3, before the IPTV platform determines whether to play a power-on advertisement, further comprising:

after the set-top box is powered on, starting up an operation system and a streaming media player, and reporting the power-on message to the IPTV platform.

8. The method according to claim 4, before the IPTV platform determines whether to play a power-on advertisement, further comprising:

after the set-top box is powered on, starting up an operation system and a streaming media player, and reporting the power-on message to the IPTV platform.

9. A system for playing a set-top box power-on advertisement, comprising: an Internet protocol television (IPTV) platform, a set-top box, and an advertisement management module, wherein:

the IPTV platform is configured to determine whether to play a power-on advertisement after receiving a power-on message reported by the set-top box, if yes, return a power-on advertisement playing notification to the set-top box;

the advertisement management module is configured to analyze a hotness value of a subscriber watching TV programs/videos on demand according to a watching record of the subscriber of the set-top box by means of cloud statistical analysis, and analyze according to the hotness value a uniform resource locator (URL) address corresponding to a content of the power-on advertisement in which the subscriber is interested; and the set-top box is configured to send an advertisement acquiring request to the advertisement management module according to the power-on advertisement playing notification, and acquire the URL address of the corresponding power-on advertisement; establish a connection with an advertisement media server according to the URL address, and play the power-on advertisement transmitted by the advertisement media server; and wherein the IPTV platform comprises:

an acquiring module, configured to acquire subscriber information of the set-top box;

a first determination module, configured to determine a subscriber type of the set-top box; wherein the subscriber type includes common subscriber and VIP subscriber; and a second determination module, configured to determine weather to play the power-on advertisement according to the subscriber type.

10. The system according to claim 9, wherein, the advertisement management module is further configured to:

collect and analyze an operation record of the subscriber, and obtain a power-on advertisement type corresponding to the operation record;

match for the set-top box with the corresponding power-on advertisement according to the power-on advertisement type.

11. The system according to claim 10, further comprising an advertisement media server, wherein the advertisement media server is configured to:

create a service thread with a steaming media server; and transmit the power-on advertisement to the set-top box.

* * * * *